United States Patent
Nagaoka et al.

(10) Patent No.: US 8,963,474 B2
(45) Date of Patent: Feb. 24, 2015

(54) MOTOR CONTROL DEVICE

(75) Inventors: Kotaro Nagaoka, Tokyo (JP); Shinya Nishino, Tokyo (JP); Toshiaki Kimata, Tokyo (JP); Daisuke Fujino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 13/997,823

(22) PCT Filed: Dec. 7, 2011

(86) PCT No.: PCT/JP2011/078298
§ 371 (c)(1),
(2), (4) Date: Jun. 25, 2013

(87) PCT Pub. No.: WO2012/093545
PCT Pub. Date: Jul. 12, 2012

(65) Prior Publication Data
US 2013/0300337 A1 Nov. 14, 2013

(30) Foreign Application Priority Data
Jan. 5, 2011 (JP) .................................. 2011-000793

(51) Int. Cl.
*H02P 27/00* (2006.01)
*G05B 19/416* (2006.01)

(52) U.S. Cl.
CPC .............. *H02P 27/00* (2013.01); *G05B 19/416* (2013.01); *G05B 2219/43146* (2013.01); *G05B 2219/49092* (2013.01)
USPC ............................. 318/671; 318/560; 318/376

(58) Field of Classification Search
CPC ...................................................... H02P 27/00
USPC ......................................... 318/671, 560, 376
See application file for complete search history.

(56) References Cited

U.S. PATENT DOCUMENTS 6,691,810 B2 2/2004 Hasuka et al.
7,863,838 B2 * 1/2011 Aso ................................ 318/139

(Continued)

FOREIGN PATENT DOCUMENTS

JP 3 40787 2/1991
JP 10 283039 10/1998

(Continued)

OTHER PUBLICATIONS

International Search Report Issued Feb. 14, 2012 in PCT/JP11/78298 Filed Dec. 7, 2011.

*Primary Examiner* — David S Luo
(74) *Attorney, Agent, or Firm* — Oblon, Spivak, McClelland, Maier & Neustadt, L.L.P.

(57) ABSTRACT

A motor control device includes: an acceleration/deceleration processing unit that generates a servo command according to an acceleration/deceleration parameter; a servo control unit that controls a motor drive torque to drive a control target machine motor according to the servo command; a power supply unit that supplies electric power of a predetermined power supply capacity from a commercial power supply to the servo control unit; an electrical storage unit that supplies electric power supplementing the electric power; and an acceleration/deceleration parameter setting unit that computes maximum power that can be used for acceleration/deceleration based on a power storage amount in the electrical storage unit, the power supply capacity, and all energy required for acceleration, computes an acceleration/deceleration parameter that causes electric power at a time of acceleration/deceleration to be equal to or lower than the maximum power, and sets the acceleration/deceleration parameter.

6 Claims, 5 Drawing Sheets

(56) References Cited

U.S. PATENT DOCUMENTS

2009/0091281 A1 4/2009 Matsubara et al.
2010/0090627 A1 4/2010 Ting

FOREIGN PATENT DOCUMENTS

| JP | 2003 61212 | 2/2003 |
| JP | 2009 106146 | 5/2009 |

* cited by examiner

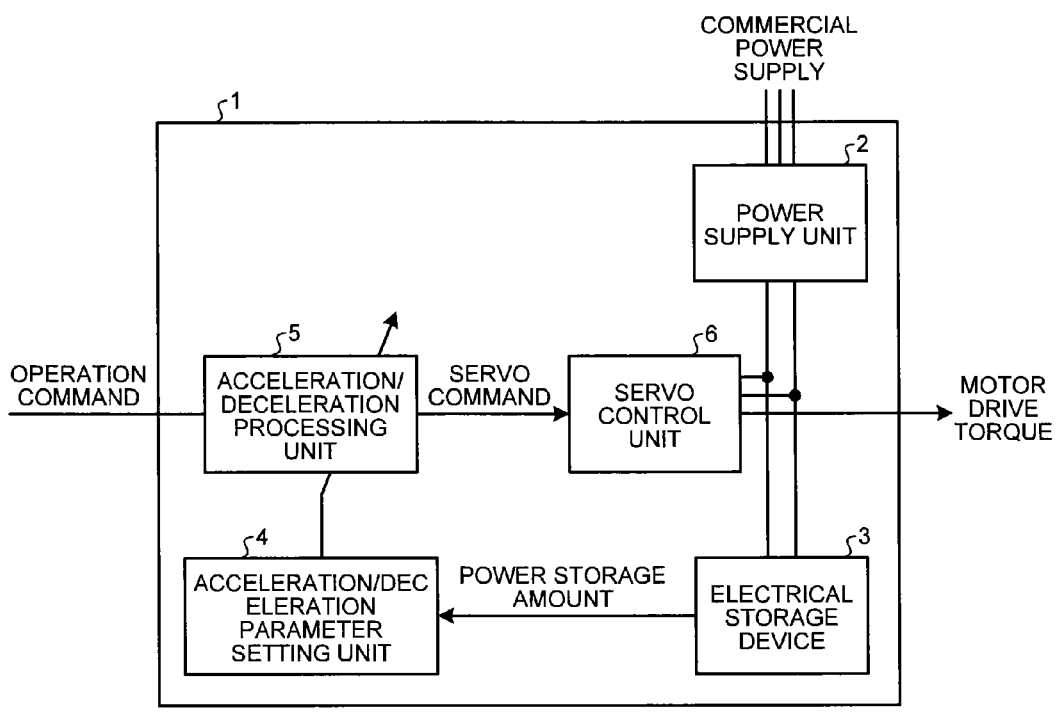
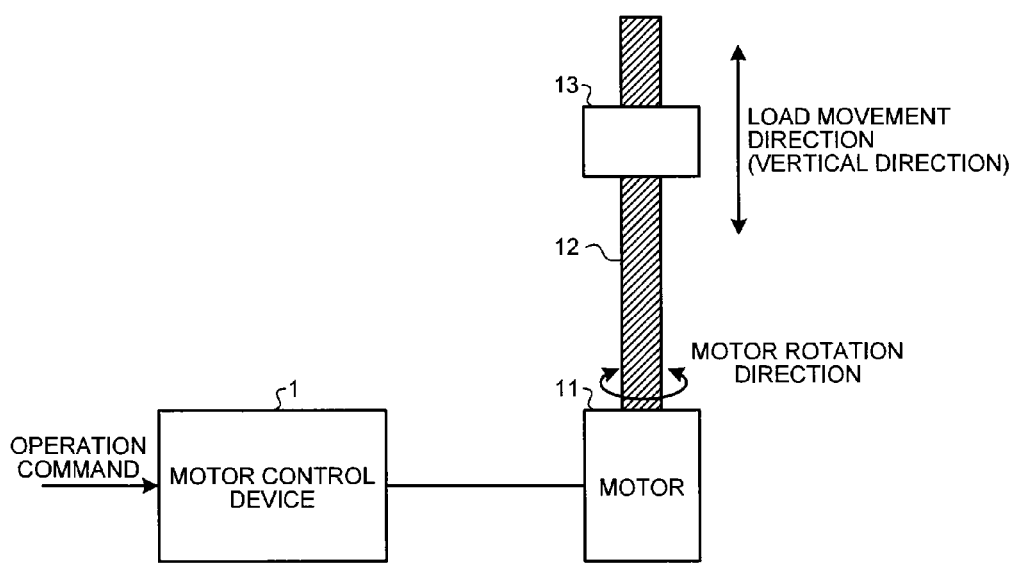

MOTOR CONTROL DEVICE

FIELD

The present invention relates to a motor control device that drives and controls a motor of a numerical-control machine tool, a press machine, and the like, and more particularly to a motor control device having an electrical storage device that stores therein regenerative energy or surplus electricity at an unloaded time.

BACKGROUND

For a motor drive unit of the numerical-control machine tool, the press machine, or the like, a system (a peak cut system) that supplies electric power temporarily required at the time of acceleration or deceleration from an electrical storage device to reduce a power supply capacity or to save contract electric power is proposed. Concerning such a system, for example, Patent Literature 1 discloses the following technique.

That is, a motor drive unit having a converter that receives an input AC voltage and performs AC-DC power conversion, and an inverter that receives DC power and performs DC-AC power conversion includes a charge/discharge control circuit and a capacitor that are parallelly connected to a link portion between the converter and the inverter, and charges or discharges energy stored in the capacitor with the charge/discharge control circuit at an arbitrary timing.

According to the technique described in Patent Literature 1, energy can be supplied from the electrical storage device in the second half of acceleration of a motor when more energy than electric power supplied from the converter during motor acceleration is required, and therefore energy supply can be achieved to suppress a peak in an input current from a power supply to the motor.

CITATION LIST

Patent Literature

Patent Literature 1: Japanese Patent Application Laid-open No. 2009-106146

SUMMARY

Technical Problem

Generally, when a motor performs an acceleration/deceleration operation, regenerative energy is generated and the energy is accumulated in the electrical storage device during deceleration, and the accumulated energy can be used during subsequent acceleration. However, in an acceleration/deceleration operation of a motor of the numerical-control machine tool or the press machine; energy required to be supplied, when a need to supply energy from the electrical storage device arises, may not have been stored in the electrical storage device. Therefore, with the configuration described in Patent Literature 1, energy may not be supplied to suppress the peak in the input current from the power supply to the motor in some cases.

For example, when vertically upward positioning with respect to a shaft that is vertically driven is performed or when a loss (such as a mechanical loss) of a machine to be operated is large, a small amount of regenerative energy may be accumulated in the electrical storage device and a shortage of energy occurs at the time of subsequent acceleration.

Furthermore, in a machine tool having a main shaft and a feed shaft, when the main shaft is accelerated and the feed shaft is accelerated immediately thereafter, there is a case where energy in the electrical storage device is consumed during acceleration of the main shaft and no energy may be supplied from the electrical storage device at the time of subsequent acceleration of the feed shaft.

When a shortage of energy that can be supplied from the electrical storage device occurs during acceleration, the speed reduces or a rate of acceleration decreases, which causes a motion of the machine to be different from that commanded. As a measure to avoid this situation, the rate of acceleration may be set low to correspond to a case where a small amount of energy is accumulated in the electrical storage device. In this case, however, the machine can be moved only at a low rate of acceleration even when energy is accumulated in the electrical storage device, which lengthens a cycle time.

The present invention has been made in view of the above problems, and an object of the present invention is to provide a motor control device that can operate a motor of a control target machine always on an appropriate acceleration/deceleration condition regardless of operation patterns or statuses of the amount of stored power.

Solution to Problem

To achieve the above object according to an aspect of the present invention, a motor control device including an acceleration/deceleration processing unit that generates a servo command according to an acceleration/deceleration parameter set for an input operation command and outputs the generated servo command, a servo control unit that controls a motor drive torque to drive a motor of a control target machine according to the servo command, a power supply unit that supplies electric power of a predetermined power supply capacity from a commercial power supply to the servo control unit, and an electrical storage unit that supplies electric power for supplementing the electric power to be supplied from the power supply unit to the servo control unit, to the servo control unit, the motor control device comprising an acceleration/deceleration parameter setting unit that computes maximum power that can used for acceleration/deceleration based on a power storage amount in the electrical storage unit, the power supply capacity, and all energy required for acceleration, computes an acceleration/deceleration parameter that causes electric power at a time of acceleration/deceleration to be equal to or lower than the maximum power, and sets the acceleration/deceleration parameter in the acceleration/deceleration processing unit.

Advantageous Effects of Invention

According to the present invention, a condition of acceleration/deceleration is set according to the power storage amount stored in an electrical storage device. Therefore, a motor of a control target machine can be operated always on a realizable acceleration/deceleration condition regardless of operation patterns or statuses of the power storage amount, and accordingly the motor can be stably driven without decrease in the speed or acceleration in the middle of acceleration/deceleration. Furthermore, it is possible to set an acceleration/deceleration parameter to increase the time of acceleration/deceleration when the power storage amount is small and to set the acceleration/deceleration parameter to perform acceleration/deceleration in a short time when the power storage amount is large. Therefore, the cycle time can be advantageously reduced.

BRIEF DESCRIPTION OF DRAWINGS

FIG. 1 is a block diagram of a configuration of a motor control device according to a first embodiment of the present invention.

FIG. 2 is a conceptual diagram of an overall configuration of a machine to be controlled by the motor control device shown in FIG. 1.

DESCRIPTION OF EMBODIMENTS

Figure 3:
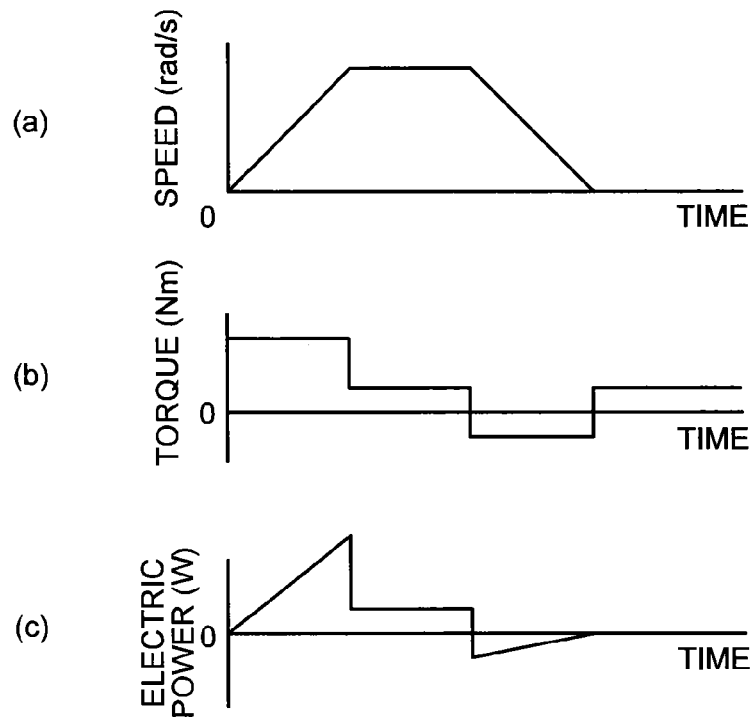
FIG. 3 is a characteristic diagram for explaining an operation and the like of a motor that is driven when a servo command output from an acceleration/deceleration processing unit shown in FIG. 1 is a command for a vertically upward operation.

Exemplary embodiments of a motor control device according to the present invention will be explained below in detail with reference to the accompanying drawings. The present invention is not limited to the embodiments.

First Embodiment

FIG. 1 is a block diagram of a configuration of a motor control device according to a first embodiment of the present invention. In FIG. 1, a motor control device 1 according to the first embodiment includes a power supply unit 2, an electrical storage device 3, an acceleration/deceleration parameter setting unit 4, an acceleration/deceleration computing unit 5, and a servo control unit 6. The acceleration/deceleration parameter setting unit 4 is a constituent element added in the present embodiment.

The power supply unit 2 includes a converter and converts three-phase AC power received from a commercial power supply into DC power to supply the DC power to the servo control unit 6. The electrical storage device 3 is a device that stores electric power therein, such as a condenser or a capacitor, and supplies DC power to the servo control unit 6 when electric power from the power supply unit 3 is not enough for the servo control unit 6 to drive the motor. That is, the servo control unit 6 and the electrical storage device 3 form a DC circuit connected in parallel with the power supply unit 2.

In the present embodiment, the electrical storage device 3 has a function of outputting information of the amount of power currently stored therein to the acceleration/deceleration parameter setting unit 4. The information of the power storage amount can be output by any method, such as a method of outputting the information as an analog signal or a method of outputting the information through serial communication, as long as the power storage amount can be transmitted from moment to moment.

The acceleration/deceleration parameter setting unit 4 computes an acceleration/deceleration parameter based on the power storage amount output from the electrical storage device 3 and information of a power supply capacity of the power supply unit 2 which is set as known data, by a method explained later to be set in the acceleration/deceleration processing unit 5.

With a common configuration, upon input of an operation command such as a movement distance or a movement speed, the acceleration/deceleration processing unit 5 performs an acceleration/deceleration process according to an acceleration/deceleration parameter set in advance, such as a command acceleration or a maximum current value. In the first embodiment, the acceleration/deceleration processing unit 5 performs an acceleration/deceleration process according to the acceleration/deceleration parameter set by the acceleration/deceleration parameter setting unit 4, and outputs an operation command, such as a speed command or a position command, which is generated in the acceleration/deceleration process, as a servo command to the servo control unit 6.

The servo control unit 6 incorporates an inverter therein, and converts the DC power input from the power supply unit 2 or the electrical storage device 3 into AC power to generate a drive torque for causing the motor to operate according to the servo command.

FIG. 2 is a conceptual diagram of an overall configuration of a machine to be controlled by the motor control device shown in FIG. 1. In FIG. 2, a rotation shaft of a motor 11 is coupled to a ball screw 12 vertically arranged in the control target machine and a load 13 is mounted on the ball screw 12. In the first embodiment, a case where the motor control device 1 drives and controls the motor 11 that moves the load 13 vertically upwards or downwards through the vertically-arranged ball screw 12 is explained.

Therefore, the operation command input to the acceleration/deceleration processing unit 5 indicates a movement distance and a movement speed for moving the load 13 to a target position at a certain speed. The acceleration/deceleration parameter set by the acceleration/deceleration parameter setting unit 4 in the acceleration/deceleration processing unit 5 is assumed to be a command acceleration. Accordingly, the acceleration/deceleration processing unit 5 performs the acceleration/deceleration process to cause the load 13 to move the movement distance designated by the operation command and at the movement speed also designated by the operation command, and to change the speed at the command acceleration specified by the acceleration/deceleration parameter, and outputs the servo command for realizing an operation pattern shown in FIG. 3 or 4 to the servo control unit 6.

Figure 4:
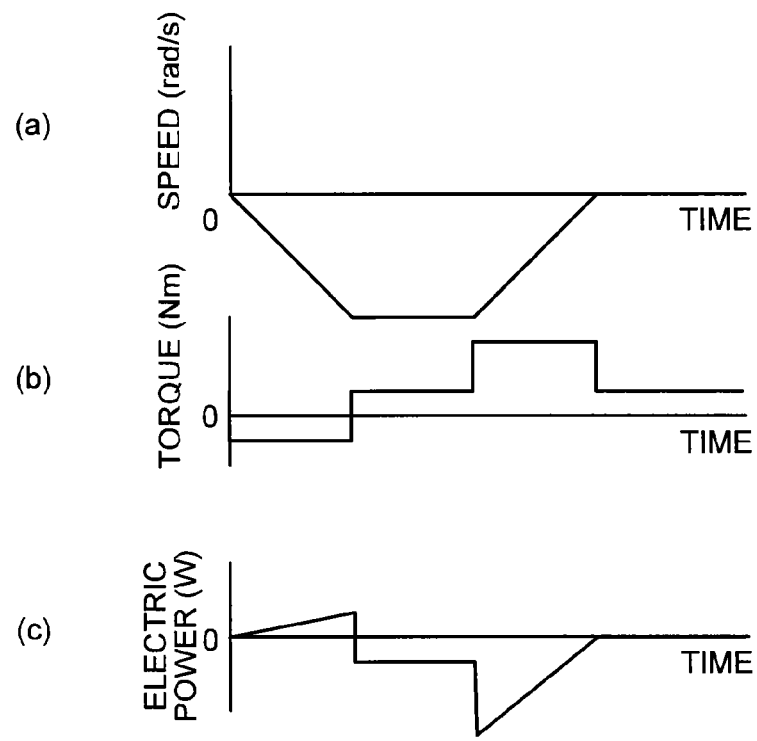
FIG. 4 is a characteristic diagram for explaining an operation and the like of a motor that is driven when a servo command output from the acceleration/deceleration processing unit shown in FIG. 1 is a command for a vertically downward operation.

FIG. 3 is a characteristic diagram for explaining an operation and the like of a motor that is driven when a servo command output from the acceleration/deceleration processing unit 5 is a command for a vertically upward operation. FIG. 4 is characteristic diagram for explaining an operation and the like of a motor that is driven when a servo command output from the acceleration/deceleration processing unit 5 is a command for a vertically downward operation. In FIGS. 3 and 4, change characteristics of the speed (rad/s) (FIGS. 3(a) and 4(a)), the torque (Nm) (FIGS. 3(b) and 4(b)), and the electric power (W) (FIGS. 3(c) and 4(c)) in a case where an acceleration/deceleration process of moving the load 13 over a predetermined distance is performed are shown.

(a) The speed (rad/s): The speed has an absolute value increasing with an acceleration specified by the acceleration/deceleration parameter after start of movement, and becomes a constant speed when the designated movement speed is reached. Deceleration is then started before completion of movement corresponding to the command movement distance and is controlled to cause the speed to be zero at the time of completion of the movement corresponding to the movement distance.

(b) The torque (Nm): The torque is obtained by adding a value obtained by multiplying the acceleration, which is obtained by differentiating the speed once with respect to the time, by the inertia of a load, and a torque for canceling disturbance. In this example, the load 13 that vertically moves is considered and thus the gravity acts as the disturbance. Therefore, a torque for canceling the gravity as the disturbance is constantly added.

(c) The electric power (W): The electric power can be obtained as a product of an output generated by the motor, that is, the speed, and the torque if effects of various losses such as friction and a motor loss are neglected. Power running that consumes electric power is performed when the electric power has a positive value and regeneration, that is, deceleration that generates electric power is performed when the electric power has a negative value. The electric power supplied from the power supply unit 2 and the electrical storage device 3 is consumed during the power running, and regenerative energy is stored in the electrical storage device 3 during the regeneration. That is, the amount of power stored in the electrical storage device 3 is regenerative energy generated during movement of the load 13 and has a value obtained by integrating negative portions of the electric power.

When the case where the load 13 moves vertically upwards (FIG. 3) and the case where the load 13 moves vertically downwards (FIG. 4) are compared, regenerative energy generated in the case of vertically-upward movement is less than that generated in the case of vertically-downward movement. In the case of power running, more electric power is required at the time of vertically-upward movement than that at the time of vertically-downward movement. This indicates that the amount of power stored in the electrical storage device 3 varies according to a pattern of the operation command.

The position command after acceleration/deceleration is obtained by integrating the speed pattern after the acceleration/deceleration process as shown in FIG. 3(a) or FIG. 4(a) with respect to the time, and is input to the servo control unit 6 as the servo command. In the servo control unit 6, a servo control is performed through a feedforward control or a feedback control so that the position of the load 13 follows a position specified by the servo command.

The acceleration/deceleration parameter setting unit 4 obtains maximum power that can be used for acceleration/deceleration based on the power storage amount in the electrical storage device 3 and the power supply capacity of the power supply unit 2 which is previously set as the known data, and sets an acceleration/deceleration parameter that causes electric power during acceleration/deceleration not to exceed the maximum power in the acceleration/deceleration processing unit 5.

Figure 5:
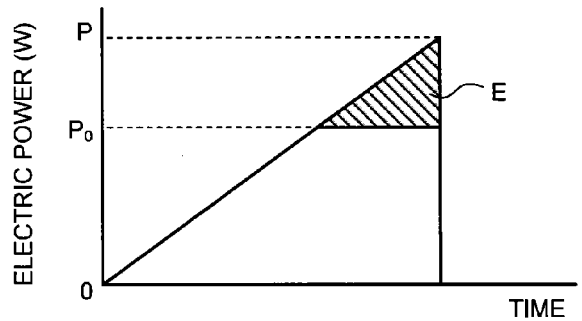
FIG. 5 is a characteristic diagram for explaining a maximum-power computing method performed in an acceleration/deceleration parameter setting unit shown in FIG. 1.

FIG. 5 is a characteristic diagram for explaining a maximum-power computing method performed in the acceleration/deceleration parameter setting unit 4. In FIG. 5, the horizontal axis represents the time from start of acceleration and the vertical axis represents the electric power during acceleration. P0 (W) indicates the power supply capacity of the power supply unit 2 and P (w) indicates the maximum power that can be used for acceleration/deceleration.

In FIG. 5, assuming acceleration is performed with a constant torque, electric power linearly increases during acceleration, exceeds the power supply capacity P0 of the power supply unit 2, and reaches the maximum power P that can be used for acceleration/deceleration. In this case, an area of a hatched portion exceeding the power supply capacity P0 corresponds to an amount E of energy supplied from the electrical storage device 3 having the power storage amount E (J). When the acceleration is performed with a constant torque, the hatched portion exceeding the power supply capacity P0 is triangle-shaped as shown in FIG. 5.

Therefore, a ratio between all necessary energy Ea and the energy amount E supplied from the electrical storage device 3 is equal to a ratio between the square of the maximum power P that can be used for acceleration/deceleration and the square of a difference between the maximum power P that can be used for acceleration/deceleration and the power supply capacity P0. When this is represented by an expression, the following expression (1) is obtained. The all necessary energy Ea may be obtained by previously measuring an amount of power consumed at the time of acceleration, or kinetic energy obtained by calculation based on the inertia of the load and the command speed may be used as the all necessary energy Ea.

$$E/E_a = (P-P_0)^2/P^2 \quad (1)$$

The maximum power P (W) that can be used for acceleration/deceleration can be obtained according to the following expression (2) based on the relation of the expression (1).

$$P = \frac{\sqrt{E_a}}{\sqrt{E_a} + \sqrt{E}} P_0 \quad (2)$$

The maximum power P that can be used for acceleration/deceleration corresponds to the product of the command speed and an acceleration/deceleration torque, and the acceleration/deceleration torque corresponds to the product of the command acceleration and the inertia of the load if disturbance is neglected. Therefore, a value obtained by dividing the maximum power P that can be used for acceleration/deceleration by the command speed v (rad/s) and further dividing an obtained value by the inertia J (kgm$^2$) of the load 13 is defined as the command acceleration "a" (rad/s$^2$), and the command acceleration "a" is set as a parameter of the acceleration/deceleration processing unit 5. When computing of the command acceleration "a" is represented by an expression, the following expression (3) is obtained.

$$a = \frac{P}{v \cdot J} \quad (3)$$

The command acceleration "a" is the maximum command acceleration with which acceleration/deceleration can be performed using the current power storage amount E. However, there are conditions other than power consumption, such as the machine capability and vibration, as restrictions. When the upper limit of the acceleration is separately limited by these restrictions, a smaller one of the command acceleration "a" obtained by the expression (3) and the upper limit of the acceleration defined by the conditions other than the power consumption may be set as the command acceleration.

While the example in which the shaft to be driven includes the rotation motor and the ball screw has been explained above, the present embodiment can be similarly applied to a case where the shaft is driven by a linear motor. In such a case, it suffices to set the unit of the command speed to m/s, to set the unit of the command acceleration to m/s$^2$, and to replace the inertia with the mass (the unit is kilogram).

In computing of the command acceleration, the computing is performed considering that the product of the inertia of the load and the command acceleration corresponds to the torque with disturbance being neglected. However, the computing may be performed in consideration of disturbance such as gravity and friction. In this case, parameters such as gravity and friction are identified based on a result of previous measurement of the torque at the time of stop or during constant speed feed, and set.

As described above, according to the first embodiment, a condition of acceleration/deceleration is set according to the amount of power stored in the electrical storage device. Therefore, the motor as the control target machine can be operated always on a realizable acceleration/deceleration condition regardless of the operation patterns or statuses of the power storage amount, and thus the motor can be stably driven without decrease in the speed or acceleration in the middle of the acceleration/deceleration.

Furthermore, setting of the acceleration/deceleration parameter can be performed to increase the time of acceleration/deceleration when the power storage amount is small, and to perform acceleration/deceleration in a short time when the power storage amount is large. Therefore, the cycle time can be shortened.

In addition, the maximum power amount that can be used for motor drive is computed based on the energy amount currently stored in the electrical storage device and the acceleration/deceleration parameter is set to drive the motor with an energy amount equal to or smaller than the maximum power amount. Therefore, the motor can be driven with an energy amount not exceeding the maximum power amount.

Second Embodiment

Figure 6:
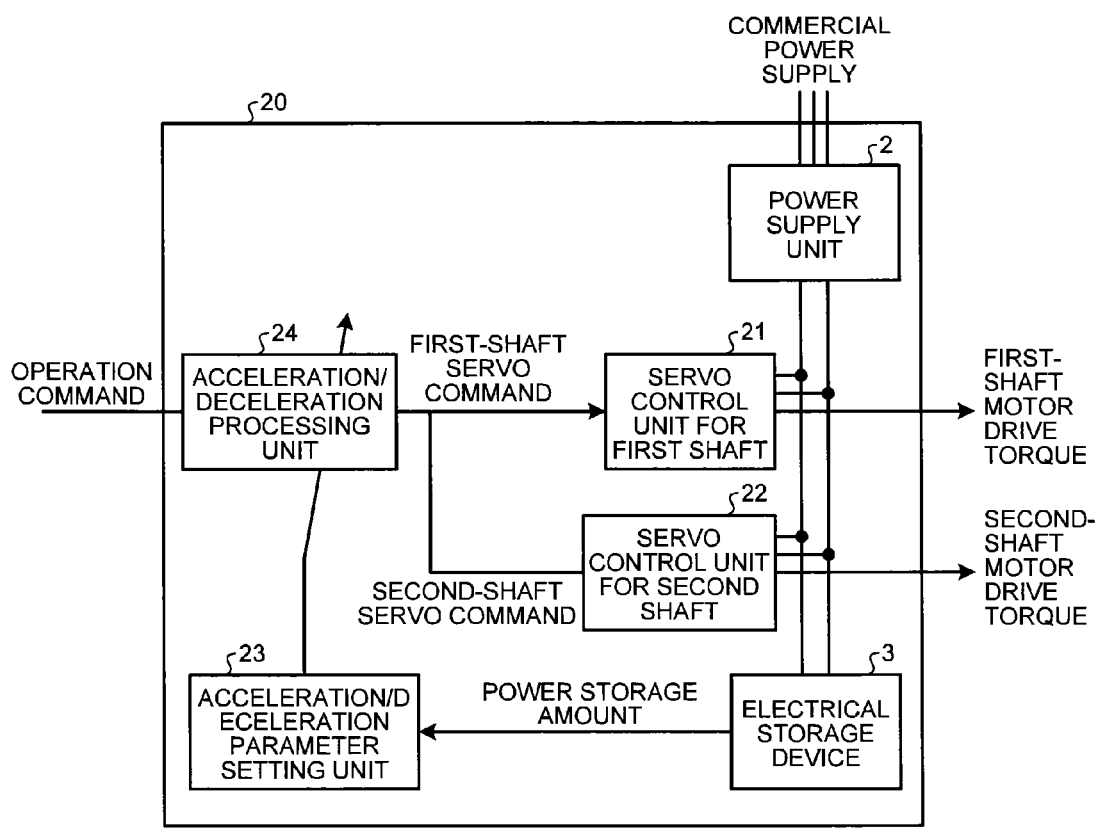
FIG. 6 is a block diagram of a configuration of a motor control device according to a second embodiment of the present invention.

FIG. 6 is a block diagram of a configuration of a motor control device according to a second embodiment of the present invention. In the second embodiment, a configuration example of a motor control device that controls a plurality of shafts of a control target machine in a lump is described. In FIG. 6, a simplest configuration example in which two shafts are controlled is shown. In FIG. 6, constituent elements identical or equivalent to the constituent elements shown in FIG. 1 (the first embodiment) are denoted by like reference signs. Elements related to the second embodiment will be mainly explained below.

That is, in FIG. 6, in a motor control device 20 according to the second embodiment, a servo control unit 21 for a first shaft and a servo control unit 22 for a second shaft are provided in the configuration shown in FIG. 1 (the first embodiment) instead of the servo control unit 6. Along with this, there are some additions of functions to an acceleration/deceleration parameter setting unit 23 and an acceleration/deceleration processing unit 24, which are denoted by reference signs different from those in the first embodiment.

In the second embodiment, the power supply unit 2 supplies DC power converted from the commercial power supply parallelly to the servo control unit 21 for a first shaft and the servo control unit 22 for a second shaft. The electrical storage device 3 according to the second embodiment also supplies a shortfall in the DC power parallelly to the servo control unit 21 for a first shaft and the servo control unit 22 for a second shaft. Therefore, the servo control unit 21 for a first shaft, the servo control unit 22 for a second shaft, and the electrical storage device 3 form a DC circuit connected in parallel with the power supply unit 2.

While performing computing of an acceleration/deceleration parameter by the method as mentioned in the first embodiment, the acceleration/deceleration parameter setting unit 23 according to the second embodiment obtains acceleration/deceleration parameters for the first shaft and the second shaft and sets the obtained parameters in the acceleration/deceleration processing unit 24.

With a common configuration, upon input of an operation command such as movement distances or movement speeds of the two shafts, the acceleration/deceleration processing unit 24 performs the acceleration/deceleration process according to acceleration/deceleration parameters previously set, such as command accelerations or maximum current values. However, in the second embodiment, the acceleration/deceleration processing unit 24 performs the acceleration/deceleration process according to the acceleration/deceleration parameters set by the acceleration/deceleration parameter setting unit 23, sets operation commands, such as speed commands or position commands, for the two shafts generated in the acceleration/deceleration process as a first-shaft servo command and a second-shaft servo command, and outputs the servo commands to the servo control unit 21 for a first shaft and the servo control unit 22 for a second shaft, respectively.

The servo control unit 21 for a first shaft and the servo control unit 22 for a second shaft each incorporate therein an inverter, and convert the input DC power into AC power, so that the servo control unit 21 for a first shaft generates a first-shaft motor drive torque for operating a motor of the first shaft according to the first-shaft servo command and that the servo control unit 22 for a second shaft generates a second-shaft motor drive torque for operating a motor of the second shaft according to the second-shaft servo command.

Figure 7:
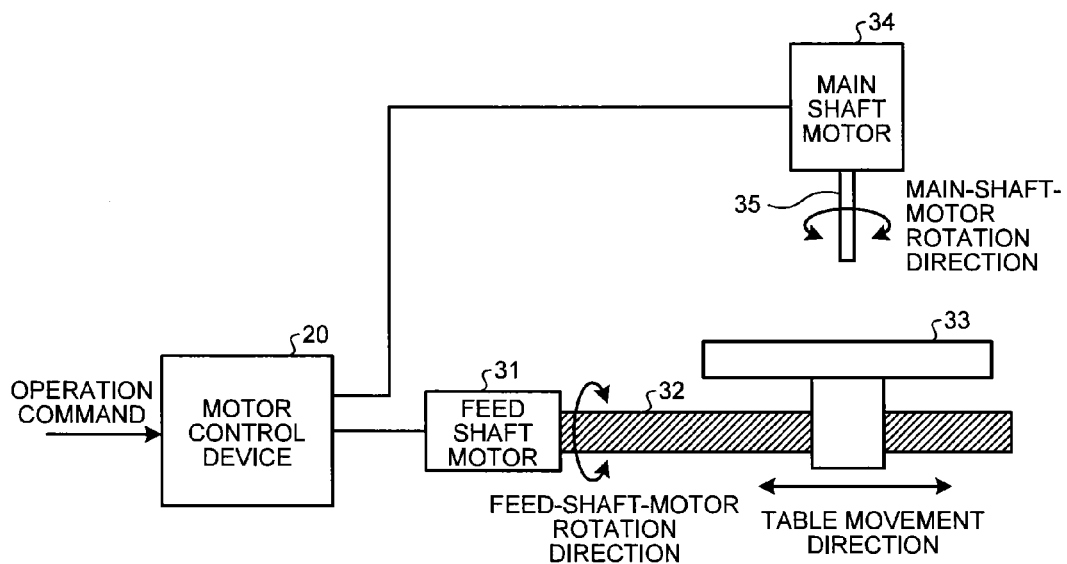
FIG. 7 is a conceptual diagram of an overall configuration of a machine that is controlled by the motor control device shown in FIG. 6.

FIG. 7 is a conceptual diagram of an overall configuration of a machine that is controlled by the motor control device shown in FIG. 6. In FIG. 7, a feed shaft motor 31 is the motor of the first shaft. The rotation shaft of the feed shaft motor 31 is coupled to a ball screw 32 horizontally arranged and a table 33 acting as a load is mounted on the ball screw 32. A main shaft motor 34 placed right above the table 33 is the motor for the second shaft, and a tool 35 acting as a load is attached to the rotation shaft of the main shaft motor 34 and hangs down.

That is, in the second embodiment, a case where the motor control device 20 parallelly performs a control operation to drive the motor for the first shaft (the feed shaft motor 31) to rotate the ball screw 32 and horizontally move the table 33 as the load, and a control operation to drive the motor for the second shaft (the main shaft motor 34) to rotate the tool 35 as the load at a certain speed is explained.

Therefore, it is assumed that the operation command input to the acceleration/deceleration processing unit 24 designates a feed-shaft movement distance and a feed-shaft movement speed for moving the table 33 to a target position at a certain speed, and a main-shaft rotation speed for rotating the tool 35 at a certain speed. The acceleration/deceleration parameters set by the acceleration/deceleration parameter setting unit 23 in the acceleration/deceleration processing unit 24 include a feed-shaft command acceleration and a main-shaft current limit value.

Accordingly, with respect to the feed shaft, the acceleration/deceleration processing unit 24 performs the acceleration/deceleration process to move the feed shaft over the feed-shaft movement distance designated by the operation command at the feed-shaft movement speed also designated by the operation command, and to change the speed of the feed shaft with the command acceleration specified by the acceleration/deceleration parameter, and outputs the first-shaft servo command. Furthermore, with respect to the main shaft, the acceleration/deceleration processing unit 24 performs the acceleration/deceleration process for the main shaft to cause a current required to generate the drive torque to have a value equal to or smaller than the current limit value specified by the acceleration/deceleration parameter, and outputs the second-shaft servo command.

In the second embodiment, after the main shaft motor 34 is rotated, the feed shaft motor 31 is rotated to move the table 33, and then an operation of stopping rotation of the main shaft motor 34 is performed after movement of the table 33 is completed.

Figure 8:
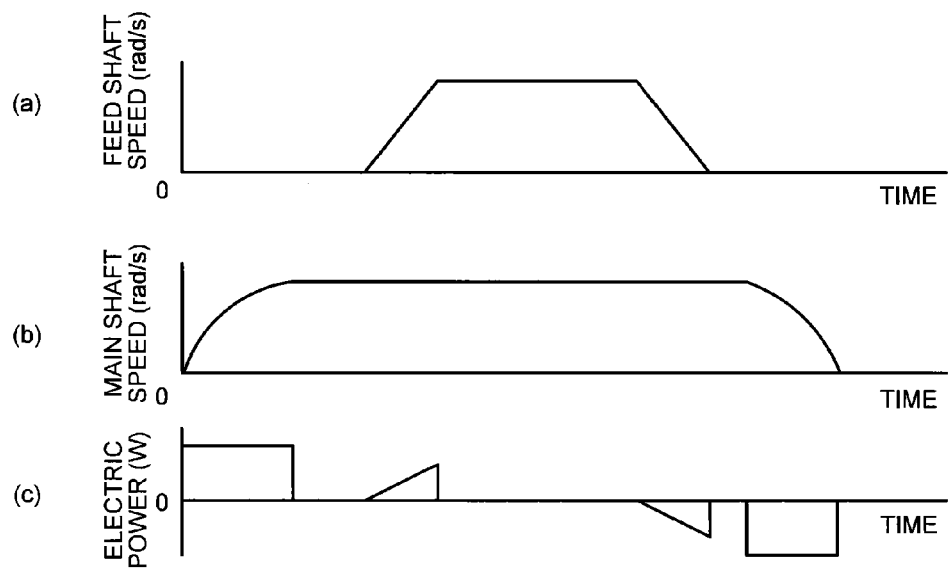
FIG. 8 is a characteristic diagram for explaining an operation and the like of two motors that are driven according to two servo commands output by the acceleration/deceleration processing unit shown in FIG. 6.

FIG. 8 is characteristic diagram for explaining an operation and the like of two motors that are driven according to two servo commands output by the acceleration/deceleration processing unit shown in FIG. 6. In FIG. 8, each one of the change characteristics of the feed shaft speed (rad/s) (a); the main shaft speed (rad/s) (b); and the electric power (W) in a case where an acceleration/deceleration process of rotating the feed shaft motor 31 to move the table 33 over a certain distance while the main shaft motor 34 is rotated at a certain speed is performed are shown.

(a) The feed shaft speed (rad/s): The speed of the feed shaft motor 31 has an absolute value increasing with an acceleration specified by the acceleration/deceleration parameter after movement of the table 33 is started, and becomes a constant speed when the designated movement speed is reached. Deceleration is started before the movement corresponding to the designated movement distance is completed, and is controlled to cause the speed to be zero when the movement corresponding to the movement distance is completed.

(b) The main shaft speed (rad/s): The speed of the main shaft motor 34 increases until it reaches the designated main-shaft rotation speed after start of the movement of the table 33. Generally, the torque of the main shaft motor 34 decreases as the speed of the main shaft motor 34 increases, and thus the main shaft motor 34 has such drive characteristics that the rate of increase in the speed becomes more moderate as the speed of the main shaft motor 34 becomes higher.

(c) The electric power (W): The electric power has a value proportional to the speed of the feed shaft motor 31 during acceleration/deceleration of the feed shaft motor 31 as in the first embodiment if effects of various losses such as friction and a motor loss are neglected. During acceleration/deceleration of the main shaft motor 34, the output during acceleration/deceleration is designed to be constant and thus the electric power has a substantially constant value. The electric power has a positive value during acceleration of the feed shaft and the main shaft, and has a negative value during deceleration of the feed shaft and the main shaft.

As described in the first embodiment, the electric power of negative values is stored in the electrical storage device 3. The amount of power stored in the electrical storage device 3 has a value obtained by integrating negative value portions of the electric power. When the power supply capacity of the power supply unit 2 is lower than the upper limit value of the power shown in FIG. 8, electric power is supplied from the electrical storage device 3. Therefore, the electrical storage device 3 has a small power storage amount at the time of completion of acceleration of the main shaft and thus cannot supply sufficient power at the time of subsequent acceleration of the feed shaft. If acceleration is performed with a high acceleration in this case, a shortage of power occurs in the middle of the acceleration.

Therefore, in the second embodiment, the acceleration/deceleration parameter setting unit 23 obtains a maximum power that can be used for acceleration/deceleration based on the power supply capacity of the power supply unit 2 and the power storage amount in the electrical storage device 3, and sets the command acceleration for the feed shaft and the current limit value for the main shaft to cause necessary power during acceleration to be equal to or lower than the maximum power, as described in the first embodiment. Computing of the maximum power that can be used for acceleration/deceleration and computing of the command acceleration for feed shaft that causes necessary power during acceleration to be equal to or lower than the maximum power can be performed in the same manner as in the first embodiment.

To compute the current limit value for the main shaft that causes necessary power during acceleration to be equal to or lower than the maximum power, it suffices to use a model that is created by previous modeling of a relation between the current value and the power consumption. Because the current value and the power consumption generally have a substantially proportional relation, a value obtained by dividing the maximum power by a relevant proportionality coefficient is set as the current limit value. Alternatively, a table may be created by previously measuring a relation between the current value and the power consumption to perform a reverse lookup of the table.

While the acceleration/deceleration process for the motors of the plural shafts is performed in one acceleration/deceleration processing unit in FIG. 6, the acceleration/deceleration process for each shaft may be performed in an individual acceleration/deceleration processing unit.

As described above, according to the second embodiment, a condition of acceleration/deceleration is set according to the power storage amount stored in the electrical storage device. Therefore, even when a plurality of motors in a control target machine is to be driven at different timings, the motors can be operated always on a realizable acceleration/deceleration condition regardless of the operation patterns or statuses of the power storage amount, and thus the motors can be stably driven without decrease in the speed or acceleration in the middle of acceleration/deceleration.

Furthermore, it is possible to set the acceleration/deceleration parameters to increase the time of acceleration/deceleration when the power storage amount is small, and to set the acceleration/deceleration parameters to perform acceleration/deceleration in a short time when the power storage amount is large. Therefore, the cycle time can be reduced.

Additionally, the maximum power amount that can be used for motor drive is computed based on the energy amount currently stored in the electrical storage device, and then the acceleration/deceleration parameters are set to drive the motors with electric power equal to or lower than the maximum power amount. Therefore, even when the motors are to be driven at different timings, the motors can be driven with electric power in a range not exceeding the maximum power amount.

Third Embodiment

Figure 9:
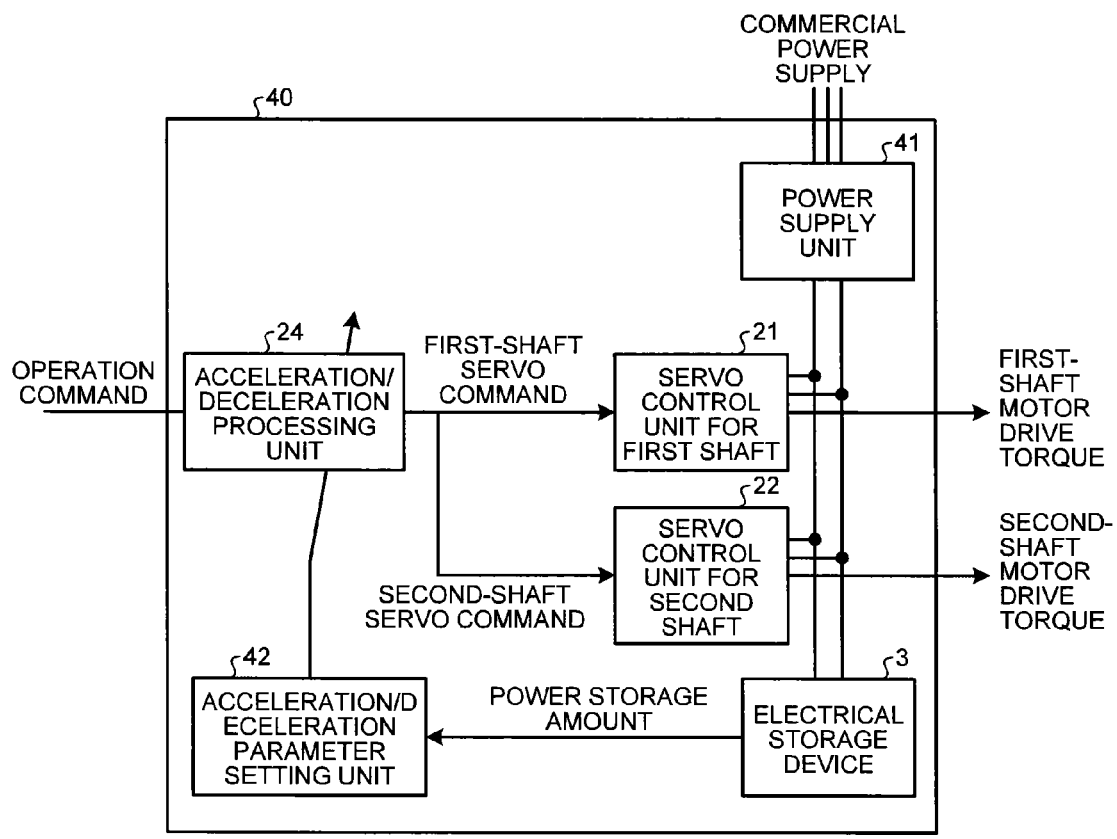
FIG. 9 is a block diagram of a configuration of a motor control device according to a third embodiment of the present invention.

FIG. 9 is a block diagram of a configuration of a motor control device according to a third embodiment of the present invention. In FIG. 9, constituent elements identical or equivalent to the constituent elements shown in FIG. 6 (the second embodiment) are denoted by like reference signs. Elements related to the third embodiment will be mainly explained below.

In FIG. 9, a motor control device 40 according to the third embodiment has a power supply unit 41 instead of the power supply unit 2, and an acceleration/deceleration parameter setting unit 42 instead of the acceleration/deceleration parameter setting unit 23 in the configuration shown in FIG. 6 (the second embodiment). Other constituent elements are identical to those shown in FIG. 6.

The power supply unit 41 has a power-supply regeneration function and a function of feeding regenerative energy generated at the time of deceleration of a motor to the side of the commercial power supply is added thereto. A function of separately setting acceleration/deceleration parameters for the main shaft as a current limit value at the time of acceleration and a current limit value at the time of deceleration is added to the acceleration/deceleration parameter setting unit 42.

In this case according to the third embodiment, the electric power and the current value at the time of acceleration of the main shaft are subject to a restriction of the power supply capacity of the power supply unit 41, and the electric power and the current value at the time of deceleration are subject to a restriction of the regeneration capacity of the power supply unit 41. Generally, the current limit value at the time of deceleration is determined to cause electric power fed by the power supply unit 41 to the side of the commercial power supply at the time of deceleration to be equal to or lower than a power value determined by the regeneration capacity. When the electrical storage device 3 is included, an amount of power exceeding the regeneration capacity can be stored in the electrical storage device 3. However, there is an upper limit also in the capacity of the electrical storage device 3 and thus the current limit value at the time of deceleration is set according to the power storage amount in the electrical storage device 3 by the acceleration/deceleration parameter setting unit 42.

The acceleration/deceleration parameter setting unit 42 obtains maximum recoverable regenerative power based on the power storage amount in the electrical storage device 3 and the regeneration capacity of the power supply unit 41 which is set as known data, and also sets the current limit value to prevent the generated regenerative power from exceeding the maximum value.

Figure 10:
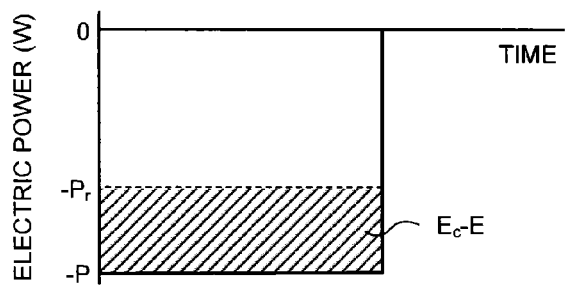
FIG. 10 is a characteristic diagram for explaining a method of computing maximum regenerative power in an acceleration/deceleration parameter setting unit shown in FIG. 9.

FIG. 10 is a characteristic diagram for explaining a method of computing maximum regenerative power in the acceleration/deceleration parameter setting unit shown in FIG. 9. In FIG. 10, the horizontal axis represents the time from start of deceleration and the vertical axis represent electric power during deceleration. The electric power during deceleration is regenerative power and thus has a negative value. Pr (W) indicates a magnitude of the regeneration capacity of the power supply unit 41 and P (W) indicates a magnitude of the maximum regenerative power that can be generated during deceleration.

In FIG. 10, an area of the hatched portion in which the magnitude of the regenerative power exceeds the magnitude Pr of the regenerative capacity corresponds to the energy amount stored in the electrical storage device 3 during deceleration. Therefore, it suffices to set this to be equal to a difference (Ec−E) between the maximum power storage amount Ec (J) of the electrical storage device 3 and the current power storage amount E (J). In the case of the main shaft motor, the output during acceleration/deceleration is substantially constant and, if it is considered that the power consumption is also constant, a ratio between all energy Ea generated during deceleration and the energy amount (Ec−E) stored in the electrical storage device 3 becomes equal to a ratio between the maximum regenerative power P to be obtained and the difference (P−Pr) between the maximum regenerative power P and the regeneration capacity Pr. When this is represented by an expression, the following expression (4) is obtained. The all energy Ea generated at the time of regeneration may be obtained by actually measuring the amount of electric power generated at the time of deceleration, or kinetic energy obtained by calculation based on the inertia of the load and the command speed may be used for the all energy Ea.

$$(E_c - E)/E_a = (P - P_r)/P \qquad (4)$$

From the relation of the expression (4), the maximum recoverable regenerative power P can be obtained according to the following expression (5).

$$P = \frac{E_a}{E_a - (E_c - E)} P_r \qquad (5)$$

The current limit value at the time of main shaft deceleration is computed to cause the regenerative power during deceleration to be equal to or lower than the maximum recoverable regenerative power. To compute the current limit value at the time of main shaft deceleration, it suffices to use a model that is created by previously modeling of a relation between the current value and the regenerative power. Generally, the current value and the regenerative power at the time of deceleration have a substantially proportional relation and thus a value obtained by dividing the maximum recoverable power by a relevant proportionality coefficient is set as the current limit value at the time of deceleration. Alternatively, a table can be created by previously measuring the relation between the current value and the regenerative power at the time of deceleration to perform a reverse lookup of the table.

As described above, according to the third embodiment, the current limit value at the time of deceleration as a condition of acceleration/deceleration is set according to the power storage amount stored in the electrical storage device and the maximum power storage amount. Therefore, even when there is a restriction on the power-supply regeneration capacity, motors of a control target machine can be operated always on a realizable acceleration/deceleration condition regardless of the operation patterns or statuses of the power storage amount, and thus the motors can be always driven stably within a range of the regeneration capacity.

In the conventional technique, the upper limit of the regenerative power generated at the time of deceleration is restricted by the upper limit of the regeneration capacity, a deceleration rate at the time of deceleration is restricted accordingly, and thus a required deceleration time cannot be reduced. However, according to the third embodiment, the required deceleration time can be reduced when the regenerative power can be recovered by the electrical storage device, and the cycle time can be reduced.

Industrial Applicability

As described above, the motor control device according to the present invention is useful as a motor control device that can operate a motor of a control target machine always on an appropriate acceleration/deceleration condition regardless of operation patterns or statuses of the amount of stored power.

Reference Signs List 1, 20, 40 motor control device
2, 41 power supply unit
3 electrical storage device
4, 23, 42 acceleration/deceleration parameter setting unit 5, 24 acceleration/deceleration processing unit
6 servo control unit
11 motor
12, 32 ball screw
13 load
21 servo control unit for first shaft
22 servo control unit for second shaft
31 feed shaft motor
33 table (load)
34 main shaft motor
35 tool

The invention claimed is:

1. A motor control device comprising:
an acceleration/deceleration processing unit that generates a servo command according to an acceleration/deceleration parameter set for an input operation command and outputs the generated servo command;
a servo control unit that controls a motor drive torque to drive a motor of a control target machine according to the servo command;
a power supply unit that supplies electric power of a predetermined power supply capacity from a commercial power supply to the servo control unit;
an electrical storage unit that supplies electric power for supplementing the electric power to be supplied from the power supply unit to the servo control unit, to the servo control unit; and
an acceleration/deceleration parameter setting unit that computes maximum power that can be used for acceleration/deceleration based on a power storage amount in the electrical storage unit, the power supply capacity, and all energy required for acceleration, computes an acceleration/deceleration parameter that causes electric power at a time of acceleration/deceleration to be equal to or lower than the maximum power, and sets the acceleration/deceleration parameter in the acceleration/deceleration processing unit.

2. The motor control device according to claim 1, wherein the acceleration/deceleration parameter setting unit computes all energy required for acceleration based on a movement speed designated by the operation command.

3. The motor control unit according to claim 1, wherein
a plurality of the servo control units are included,
the acceleration/deceleration parameter setting unit sets a plurality of acceleration/deceleration parameters that are required to compute respective servo commands of the servo control units, in the acceleration/deceleration processing unit, and
the acceleration/deceleration processing unit performs an acceleration/deceleration process according to the acceleration/deceleration parameters set by the acceleration/deceleration parameter setting unit, and generates respective servo commands for the servo control units.

4. A motor control device comprising:
an acceleration/deceleration processing unit that generates a servo command according to an acceleration/deceleration parameter set for an input operation command and outputs the generated servo command;
a servo control unit that controls a motor drive torque to drive a motor of a control target machine according to the servo command;
a power supply unit that supplies electric power from a commercial power supply to the servo control unit and has a function of regenerating electric power of a predetermined regeneration capacity;
an electrical storage device that supplies electric power for supplementing the electric power to be supplied from the power supply unit to the servo control unit, to the servo control unit and stores therein regenerative power generated by the motor; and
an acceleration/deceleration parameter setting unit that is configured to:
compute an upper limit of a magnitude of recoverable regenerative power based on a power storage amount in the electrical storage device, a maximum power storage amount of the electrical storage device, the regeneration capacity, and all energy generated at a time of deceleration;
compute an acceleration/deceleration parameter that causes a magnitude of regenerative power at a time of deceleration to be equal to or lower than the upper limit; and
set the acceleration/deceleration parameter in the acceleration/deceleration processing unit.

5. The motor control device according to claim 4, wherein the acceleration/deceleration parameter setting unit computes all energy generated at a time of deceleration based on a movement speed designated by the operation command.

6. The motor control unit according to claim 4, wherein
a plurality of the servo control units are included,
the acceleration/deceleration parameter setting unit sets a plurality of acceleration/deceleration parameters that are required to compute respective servo commands of the servo control units, in the acceleration/deceleration processing unit, and
the acceleration/deceleration processing unit performs an acceleration/deceleration process according to the acceleration/deceleration parameters set by the acceleration/deceleration parameter setting unit, and generates respective servo commands for the servo control units.

* * * * *